United States Patent [19]

Kocatas

[11] Patent Number: 4,564,377
[45] Date of Patent: Jan. 14, 1986

[54] FIBER BED SEPARATOR
[75] Inventor: Babur M. Kocatas, Clayton, Mo.
[73] Assignee: Monsanto Company, St. Louis, Mo.
[21] Appl. No.: 626,073
[22] Filed: Jun. 29, 1984
[51] Int. Cl.[4] .......................... B01D 46/10; B32B 5/12
[52] U.S. Cl. ........................................ 55/488; 55/489; 55/DIG. 25; 428/112; 428/113; 428/294
[58] Field of Search ................................. 55/485–489, 55/527, 528, DIG. 25; 210/505; 428/109, 112, 113, 294

[56] References Cited
U.S. PATENT DOCUMENTS

| 3,086,759 | 4/1963 | Goettl | 55/486 |
| 3,540,190 | 11/1970 | Brink | 55/97 |
| 3,880,626 | 4/1975 | Griwatz et al. | 55/487 |
| 4,086,070 | 4/1978 | Argo et al. | 55/97 |
| 4,120,671 | 10/1978 | Steinmeyer | 55/96 |
| 4,249,918 | 2/1981 | Argo et al. | 55/97 |
| 4,256,472 | 3/1981 | Atkins et al. | 55/489 |

FOREIGN PATENT DOCUMENTS

| 944253 | 12/1963 | United Kingdom | 428/113 |
| 291547 | 10/1971 | U.S.S.R. | 488/ |

Primary Examiner—David L. Lacey
Attorney, Agent, or Firm—Lawrence L. Limpus

[57] ABSTRACT

A fiber bed separator formed of a bed of staple fibers is provided. A discontinuity is created within the bed of fibers at a selected location to improve the drainage of liquids from the fiber bed.

10 Claims, 3 Drawing Figures

FIBER BED SEPARATOR

BACKGROUND OF THE INVENTION

This invention relates to an improved fiber bed separator for the separation of aerosols from gas stream. More particularly, it relates to a fiber bed separator whereby reentrainment of the collected liquid from aerosol containing gases is substantially prevented so as to allow extension of the operating ranges of gas bed velocity and/or aerosol loading beyond that of current fiber bed separators. This invention also relates to the creation of discontinuities within a fiber bed separator to improve the drainage of liquids from the fiber bed.

DESCRIPTION OF THE PRIOR ART

Fiber bed separators have found widespread use in applications wherein extremely fine aerosols of under three microns, and particularly under one micron, in particle size must be separated from a gas or vapor (hereinafter collectively referred to as gas) stream. Fiber beds having a collection efficiency of up to 98–99.9% have been constructed.

Reentrainment of collected liquid from the downstream surface of the fiber bed is often a problem with fiber bed separators. The aerosols in the gas being treated usually are a mixture of particulate sizes from submicron to a few microns which are coalesced in the fiber bed. The coalesced liquids are expected to drain downwardly; however, the gas flow carries the liquid to the downstream surface of the fiber bed where the shearing action of the gas flow causes reentrainment.

Downstream baffles, mesh pads and filters have been used to remove the reentrained aerosols; however, these devices do not effectively remove the smaller particles, that is, those particles below about three microns in size. In addition, these devices normally increase the pressure drop in the gas system.

Attempts have been made to avoid reentrainment of aerosols entirely by designing the fiber bed separators such that the gas velocity through the bed (i.e., the bed velocity) and/or aerosol loadings are sufficiently low that the amount of reentrained particles are held within practical or acceptable limits. This approach requires larger sizing of the fiber bed separator to provide greater bed surface area perpendicular to the direction of gas flow or restricts the allowable gas flow rates and results in higher equipment cost per unit volume of gas treated.

A more recent solution to the problem of reentrainment has been the use of bicomponent fiber bed separators such as that shown in U.S. Pat. No. 4,086,070. The bicomponent fiber bed is constructed with two fiber beds in intimate contact, one fiber bed being formed of relatively coarse fibers and the other being formed of relatively fine fibers. Typically the bed having the coarser fibers was placed upstream of the bed having the finer fibers. This typical arrangement was reversed in U.S. Pat. No. 4,086,070 in which a first bed of randomly distributed fibers having a mean fiber diameter of at least about five microns was placed upstream from a second bed of randomly distributed fibers which were preferably of a diameter of from 15 to about 200 microns in diameter. The aerosols coalesced within the upstream fiber bed, flowed to the surface between the fiber beds and drained downwardly within the second fiber bed. While this fiber bed is superior to those previously used, at high velocities the gas flow still carried some liquid to the downstream surface where it could be reentrained.

Yet another effort to prevent reentranment of aerosols is shown in U.S. Pat. No. 4,249,918. The fiber bed was made of fiber roving with a majority of the fibers therein disposed in a generally vertical direction. The roving was formed by layering a plurality of thin continuous sheets of fiber with the majority of the fibers extending generally in a vertical direction. This fiber bed provided channels for the coalesced liquid to flow downwardly; but, liquid was still carried to the downstream surface by the gas flow.

SUMMARY OF THE INVENTION

It is an object of this invention to provide a fiber bed separator and a method for treatment of aerosol containing gases without any substantial degree of reentrainment at bed velocities which otherwise would result in reentrainment.

A further object of this invention is the provision of a fiber bed separator in which a substantial portion of the coalesced aerosols will drain downwardly out of the fiber bed separator before reaching the downsteam surface where reentrainment may take place.

It is yet another object of this invention to provide a fiber bed separator in which discontinuities have been created to greatly improve the drainage of liquids and to prevent the passage of such liquids through the fiber bed to the downstream surface.

These and other objects are obtained by a fiber bed separator, and a method for its use, comprising a bed of fibers formed by a plurality of predominantly parallel slivers of staple fibers which have a weight of from approximately 0.1 to approximately 50 grams per meter and a fiber diameter of from about 5 microns to about 15 microns. The plurality of predominantly parallel slivers are placed to form layers within the bed of fibers and discontinuities are created between the layers at selected locations within the bed of fibers.

It has been found that the creation of discontinuities within the fiber bed of a fiber bed separator will provide passageways for drainage of the coalesced liquids and will substantially prevent the passage of such liquids through the fiber bed to the downstream surface. Since reentrainment is created at the downstream surface of the fiber bed, the prevention of liquid reaching the downstream surface will effectively reduce reentrainment. While the preferred method of creating the discontinuities is the inclusion of a mat of randomly oriented staple fibers between layers of the slivers used to form the fiber beds used in this invention, other methods may be used as hereinafter described. The result is the creation of a vertical passageway for drainage of the coalesced aerosols and the prevention of the coalesced aerosols passage toward the downstream surface of the fiber bed. The created pathway may be considered as having a lower capillary height than the individual sliver which form the largest part of the fiber bed separator. The fibers included within the layers of slivers will act as a capillary and retard the downward drainage of the collected aerosols. The discontinuity used to provide the vertical pathway for efficient drainage will have less capillary action; thus, drainage will be improved and the liquids will be removed from the fiber bed.

DESCRIPTION OF THE PREFERRED EMBODIMENTS

Figure 1:
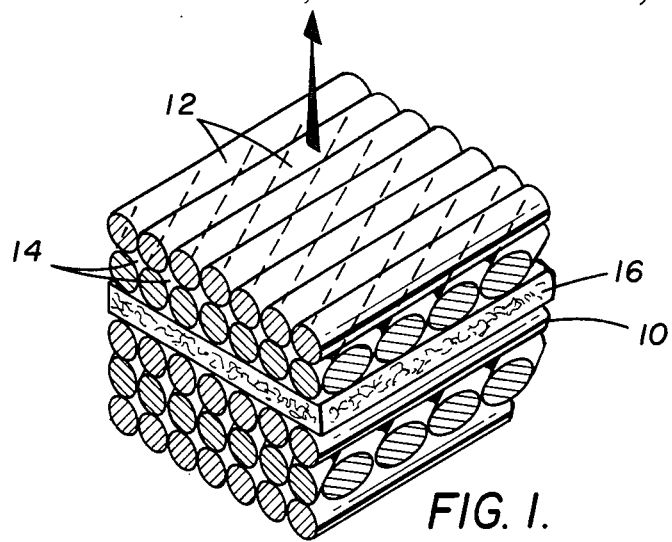
FIG. 1 shows an arcuate section removed from the cylindrical fiber bed element of FIG. 2.

Turning now to FIG. 1, an arcuate section 10 of a fiber bed separator of this invention is shown. The arcuate section 10 has been removed from the cylindrical fiber bed separator 5 shown in FIG. 2. The fiber bed is formed as a bed of staple fibers having a diameter from about 5 microns to about 30 microns or from a plurality of predominantly parallel slivers 12 which have a much smaller diameter than the roving of the prior art. In the past channels for liquid flow formed between adjacent strands of the circular roving. The use of the generally circular shaped slivers 12 cannot totally eliminate the channels which are formed; however, the much smaller diameter of the slivers when compared to the roving heretofore in use divides the channel into a plurality of small channels and reduces the fiber-free volume present at any location within the fiber bed 5 to provide a more uniform fiber packing density. This is important because it is the fibers which collect and coalesce the aerosols when the fiber bed separator is placed in use. The slivers are made of staple fibers and weigh, when glass fibers are used, from approximately 0.1 to approximately 50 grams per meter of length. The roving of the prior art generally weighed approximately 100 grams per meter and had a diameter significantly greater than the diameter of the slivers contemplated for use in this invention.

The slivers may be made of staple fibers of various materials, for example, polymeric materials such as nylons and polyesters, metal such as stainless steel and titanium, ceramic materials and glass. The only requirement is that the fibers not be too stiff and/or brittle to be formed into slivers. The slivers must be self-supporting, must retain their shape and must be sufficiently flexible to be wound into an annular-shaped fiber bed, if such a shape is desired. If glass is used for making the fibers, the fibers should have a mean diameter of from approximately 5 to approximately 30 microns, with a preferred mean diameter in the range of approximately 5 to approximately 15 microns. With glass fibers of the preferred mean diameter, the sliver will weigh from approximately 0.1 to approximately 50 grams per meter of length. The slivers are made of staple fibers, long hairlike fibers which can be wound together. Each sliver is individually twisted during its manufacture; thus, the fibers in the sliver are non-oriented.

Figure 2:
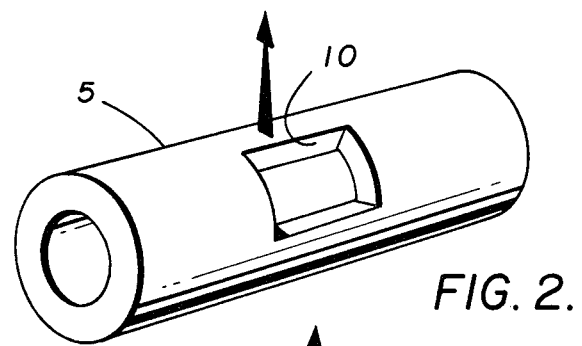
FIG. 2 shows a cylindrical fiber bed element.

FIG. 2 shows a cylindrical fiber bed separator 5. Typically the fiber bed separator 5 would be mounted with a vertical axis. The aerosol containing gas stream will typically enter the hollow interior of the fiber bed separator and pass radially outwardly through the fiber bed. An arcuate section 10 of the fiber bed separator 5 has been removed and is shown as FIG. 1. In both FIG. 1 and FIG. 2 the arrow indicates the radial flow of the gas stream which passes through the fiber bed separator.

The section 10 of fiber bed separator 5 is shown as having a plurality of layers of slivers 12. While the slivers 12 within a single layer are predominantly parallel, it is not necessary nor particularly desirable that the slivers in radially adjacent layers be parallel. By predominantly parallel it is meant that a majority of the slivers 12 in a particular single layer of slivers are parallel to one another. It is recognized that some of the slivers 12 may cross adjacent slivers during the manufacture of the fiber bed separator. Since it is easy to wind the slivers upon a central core to form a cylindrically shaped fiber bed separator 5, the predominantly parallel slivers will follow the path of a helix along the length of the fiber bed separator 5. It is equally easy to form a flat fiber bed separator in which case the slivers will be in a flat plane. It is within the contemplation of this invention to have the adjacent layers of slivers 12 formed so that the slivers in adjacent layers are predominantly parallel to one another. However, it is preferred that the adjacent layers of slivers 12 be non-parallel, that is, that the slivers be angularly offset from one another such that the slivers of adjacent layers cross one another.

It has been found that the creation of discontinuities within the fiber bed of a fiber bed separator will provide passageways for drainage of the coalesced liquids and will substantially prevent the passage of such liquids through the fiber bed to the downstream surface. A preferred method of creating the discontinuities is the inclusion of a mat 16 of randomly oriented staple fibers at selected locations between layers of the slivers 12 used to form the fiber bed used in this invention. A sufficient number of layers of slivers 12 is provided to form a fiber bed separator 5 having the required thickness to remove the aerosols present in the flowing gas stream. Typically the bed of slivers will have a thickness of from approximately 1.0 centimeters to approximately 1.5 centimeters. Within this bed of slivers 12 will be placed one or more mats 16 of randomly oriented staple fibers to create one or more discontinuities within the fiber bed.

Each sliver 12 is formed from a plurality of staple fibers which have been twisted together. The sliver acts as a capillary when it collects the aerosols from the flowing gas stream. As a capillary the sliver retards the drainage of the collected, coalesced aerosols from the fiber bed element 5. The creation of a discontinuity within the fiber bed interrupts or breaks the capillary action of the slivers. Thus, the mat 16 of randomly oriented staple fibers does not have the wicking or capillary action and the collected liquids are free to drain through the mat 16 and out of the fiber bed separator 5. The mat 16 may be of any thickness which is sufficient to create a discontinuity between the layers of slivers 12. Discontinuities have been created by the use of battery mats having a thickness of approximately 0.1 millimeter and of approximately 0.4 millimeter and by the use of a mat of fibers having a thickness of approximately 1.5 centimeters. These examples demonstrate a range of thickness for the mat 16; however, the mat is not limited to these thicknesses or to any thickness within that range. Webster's New Collegiate Dictionary, copyright 1975 by G & C Merriam Company, on page 326 defines a discontinuity as a gap. While the preferred method of creating a discontinuity within the layers of slivers 12 is the inclusion of a mat 16 of randomly oriented staple fibers between the layers of slivers 12, it is also possible to create the discontinuity or gap in other equally appropriate ways. The discontinuity may be created by using a layer of larger fibers positioned between the layers of slivers 12. It is also possible to create the discontinuity by releasing the tension on the winding such that a layer of looser fibers is created or by providing fiber strands within the slivers 12 which are of different fiber sizes or densities to create a reduced residual liquid holdup, that is a reduced capillary action. When fibers having a larger diameter are used to create the discontinuity, the diameter of the larger fiber should preferably be at least thirty percent greater than the diameter of the slivers forming the fiber bed separator. The result created by any of these methods is the creation of a vertical passageway for drainage of the coalesced aerosols from the fiber bed separator and the prevention of the aerosols passage toward the downstream surface of the fiber bed.

The use of larger threads interspersed within the layers of slivers 12 creates a non-uniformity which may be made in intentional patterns. The planar discontinuity formed by the use of mat 16 can be approximately simulated through the use of bundles of large fibers which are spaced throughout the fiber bed separator in any winding pattern. The larger fibers envisioned in these suggestions have been of lower capillary action when compared to the slivers 12 utilized to manufacture the fiber bed separator 5. This reduced capillary action allows a more rapid flow of the coalesced liquid from the fiber bed.

Figure 3:
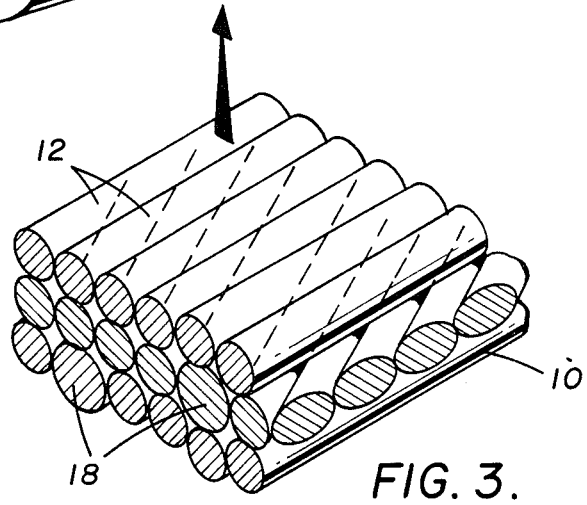
FIG. 3 shows an arcuate section removed from a cylindrical fiber bed element similar to that shown in FIG. 2.

FIG. 3 shows the use of larger threads. FIG. 3 like FIG. 1, shows an arcuate section 10 of the fiber bed separator 5 shown in FIG. 2 and identical numbers are used in FIGS. 3 and 1 to indicate identical details. The section 10 has a plurality of layers of slivers 12. While predominantly parallel, it is not necessary nor particularly desirable that the slivers in radially adjacent layers be parallel. Since it is easy to wind the slivers upon a central core to form a cylindrically shaped fiber bed separator 5, the predominantly parallel slivers will follow the path of a helex along the length of the fiber bed separator 5. Larger fibers, or threads, 18 are shown in FIG. 3 within the layers of slivers 12. It is preferred that the diameter of the larger fiber 18 be at least thirty percent greater than the diameter of the slivers 12 forming the fiber bed separator.

It is also within the contemplation of this invention to produce a gap, that is an unfilled space, within the layers of slivers 12. There are economic reasons for not preferring this method of producing the gap or discontinuity within the fiber bed separator as this method would be much more expensive than any other. As suggested above, this gap may be simulated by introducing materials having lower residual liquid holdup, that is lower capillary action, into the fiber bed separator. These materials provide a passageway for drainage of the coalesced liquid so that its passage toward the downstream surface of the fiber bed is substantially prevented.

It has thus been shown that the discontinuity or gap may be created within the layers of slivers forming the fiber bed separator of this invention to improve the separation of aerosols from the gas stream flowing through the fiber bed separator. The discontinuity may be created by making an open space within the fiber bed, by having an area of randomly packed fibers between the layers of predominantly parallel slivers or by using mats of randomly oriented fibers between the layers of slivers. The discontinuity may also be created by including heavier fibers interspersed with the slivers or by winding or laying the larger roving used in the past between the layers of slivers. Each of these creates apparent voids between the layers of slivers which form the fiber bed separator. The voids or discontinuities interrupt the aerosol travel along the gas flow direction to enable the liquid to disengage from the gas stream and to flow downwardly through the fiber bed separator.

I claim:

1. A fiber bed separator for collecting aerosols from a flowing gas stream comprising:
    a bed of staple fibers having a diameter from about 5 microns to about 30 microns, and
    means producing at least one discontinuity to produce a vertical passage for drainage of collected aerosols within said bed of fibers and to prevent the passage of aerosols from a downstream surface of the bed.

2. The fiber bed separator of claim 1 wherein said means for producing at least one discontinuity comprises:
    a layer of staple fibers having a diameter greater than the diameter of said staple fibers forming said bed of staple fibers.

3. The fiber bed separator of claim 2 wherein said diameter of said staple fibers of said layer of staple fibers is at least thirty percent greater than the diameter of said staple fibers forming said bed of staple fibers.

4. The fiber bed separator of claim 1 wherein said means for producing at least one discontinuity comprises:
    a fiber having a diameter at least thirty percent greater than the diameter of said staple fibers forming said bed of fibers, said fiber being helically wrapped within said bed of fibers.

5. A fiber bed separator for collecting aerosols from a flowing gas stream comprising:
    a bed of fibers formed by a plurality of predominantly parallel slivers of staple fibers having a weight of from approximately 0.1 to approximately 50 grams per meter, said slivers being self-supporting and able to retain their shape, said plurality of predominantly parallel slivers forming layers within said bed of fibers, and
    means producing at least one discontinuity between said layers at at least one selected location within said bed of fibers to provide a substantially vertical passage for drainage of collected aerosols within said bed of fibers and to prevent the passage of aerosols from the downstream surface of the bed.

6. The fiber bed separator of claim 5 wherein said means for producing at least one discontinuity comprises a mat of randomly oriented staple fibers, said mat having a thickness of from about 0.1 millimeter to about 0.4 millimeters.

7. The fiber bed separator of claim 5 wherein said means for producing at least one discontinuity comprises a mat of randomly oriented staple fibers, said mat having a thickness of from about 0.25 to about 0.6 centimeters.

8. A fiber bed separator for collecting aerosols from a flowing gas stream comprising:
    a bed of fibers formed by a plurality of predominantly parallel slivers of staple fibers generally having a diameter of from about 5 microns to about 30 microns and having a weight of from approximately 0.1 to approximately 50 grams per meter, said slivers being self-supporting and able to retain their shape, said plurality of predominantly parallel slivers forming layers within said bed of fibers and at least one sliver of staple fibers within said layers having a diameter substantially larger than the diameter of said predominantly parallel slivers, said at least one sliver producing a discontinuity within said bed of fibers and providing a passageway for the downward flow of said collected aerosols.

9. The fiber bed separator of claim 8 wherein said at least one sliver of staple fibers has a diameter at least thirty percent greater than the diameter of said predominantly parallel slivers.

10. A fiber bed separator for collecting aerosols from a flowing gas stream comprising:

a bed of fibers formed by a plurality of predominantly parallel slivers of staple fibers having a weight of from approximately 0.1 to approximately 50.0 grams per meter and generally having a diameter of from about 5 microns to about 30 microns, said slivers being self-supporting and able to retain their shape, said plurality of predominantly parallel slivers forming layers within said bed of fibers, and at least one mat of randomly oriented staple fibers within said bed of fibers at at least one selected location to produce at least one discontinuity between said layers of predominantly parallel slivers to provide a substantially vertical passage for drainage of said collected aerosols within said bed of fibers and to prevent the passage of aerosols from the downstream surface of the bed, said at least one mat having a thickeness of from about 0.25 centimeters to about 0.6 centimeters.

* * * * *